Figure 1:
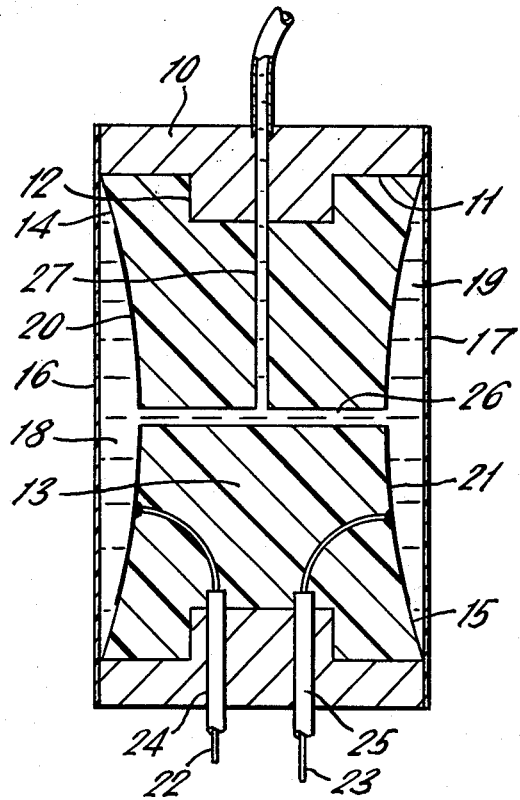

United States Patent [19]

Johnston

[11] 4,398,194

[45] Aug. 9, 1983

[54] DIFFERENTIAL PRESSURE SENSING APPARATUS

[75] Inventor: James S. Johnston, Bognor Regis, England

[73] Assignee: Rosemount Engineering Company Limited, Great Britain

[21] Appl. No.: 352,301

[22] Filed: Feb. 25, 1982

Related U.S. Application Data

[63] Continuation of Ser. No. 141,345, Apr. 18, 1980, abandoned.

[30] Foreign Application Priority Data

Apr. 26, 1979 [GB] United Kingdom ................. 7914628

[51] Int. Cl.$^3$ ...................... G08C 19/10; G08C 19/16; G01L 9/12
[52] U.S. Cl. ........................... 340/870.37; 340/870.05; 340/870.16; 340/626; 324/60 C; 73/718; 73/724; 361/283; 318/662
[58] Field of Search ...................... 340/870.37, 870.05, 340/870.16, 626; 324/60 R, 60 C, 60 CD; 73/768, 774, 780, 745, 716, 718, 724; 323/356; 318/662; 361/283

[56] References Cited

U.S. PATENT DOCUMENTS

| | | | |
|---|---|---|---|
| 3,318,146 | 5/1967 | De Leo et al. | 73/180 |
| 3,783,374 | 1/1974 | Eide et al. | 340/870.37 |
| 4,096,744 | 6/1978 | De Leo et al. | 73/180 |
| 4,169,389 | 10/1979 | Yasuhara et al. | 73/718 |
| 4,193,063 | 3/1980 | Hitt et al. | 340/870.37 |
| 4,277,254 | 7/1981 | Hanson | 48/180 R |

FOREIGN PATENT DOCUMENTS

| | | | |
|---|---|---|---|
| 1318780 | 5/1973 | United Kingdom | 73/718 |
| 553500 | 4/1977 | U.S.S.R. | 73/724 |

OTHER PUBLICATIONS

"Electronic Computers, A Made Simple Book," Henry Jacobowitz, 1963, pp. 237–242.
"Data Acquisition Handbook," Datel-Intersil, Inc., 1979, pp. 16–19.

Primary Examiner—Donnie L. Crosland
Attorney, Agent, or Firm—Kinney, Lange, Braddock, Westman and Fairbairn

[57] ABSTRACT

A differential pressure transducer is a body with a pair of opposed sensing chambers bounded by diaphragms and associated surfaces of the body. The surfaces have conducting layers and form capacitors with the metal diaphragms. The chambers are connected together and fitted with a fixed mass of oil. A signal generating circuit produces electrical signals representing the values of the two sensing capacitors which are fed to a computer to calculate the differential pressure independent of temperature.

10 Claims, 2 Drawing Figures

U.S. Patent  Aug. 9, 1983  4,398,194

DIFFERENTIAL PRESSURE SENSING APPARATUS

This is a continuation of application Ser. No. 141,345, filed Apr. 18, 1980 now abandoned.

The present invention relates to differential pressure sensing apparatus.

Prior art differential pressure sensors typically comprise transducers containing a single central sensing diaphragm with sensing chambers on opposite sides. The sensing diaphragm forms with each of the two sensing chambers a respective electrical capacitor plate system having an electrical capacity dependent on the deflection of the diaphragm. The pressures of which the difference is to be measured are applied to the sensing chambers on opposite sides of the diaphragm so that the diaphragm deflection is a measure of the differential pressure, and the two capacitor plate systems are connected in a suitable electrical circuit so that the deflection and thence the differential pressure can be measured. It is a common practice to isolate the sensing diaphragm from the medium of which the pressure is to be sensed by filling both sensing chambers with a substantially non-compressible dielectric fluid, such as oil. Further diaphragms are then required on either side of the sensing diaphragm to contain the fluid whilst permitting the pressures to be sensed to be transmitted to the sensing diaphragm.

A differential pressure transducer of the above type is described in British Patent No. 1,318,780.

Although the above prior art pressure transducers can be made to work very well, they are relatively complicated in structure. It is an object of this invention to provide a transducer of simpler construction.

According to the present invention a differential pressure sensing apparatus includes a transducer having a body and comprising a pair of sensing chambers of substantially identical geometry and response, each said chamber being defined by a diaphragm and an associated surface of the body, the diaphragm having a respective outer pressure sensing surface, and each chamber having capacitor plate means including the associated diaphragm and means on the associated body surface, whereby a corresponding deflection of each of the two diaphragms causes a corresponding change in the electrical capacity of the respective capacitor plate means, the transducer further comprising fluid passage means between the two sensing chambers, and a fixed mass of a substantially non-compressible dielectric fluid filling said two chambers and the fluid passage means whereby a change in the differential pressure between the outer pressure sensing surfaces of the two diaphragms causes one diaphragm to deflect inwards relative to its associated sensing chamber and the other to deflect by a corresponding amount outwards relative to its associated sensing chamber, the apparatus further including electrical signal generating means responsive to said capacitor plate means to provide at least respective signals representative of the electrical capacities of the two capacitor plate means, and automatic computing apparatus arranged to receive at least said respective signals and to compute from the capacity values represented thereby the value of said differential pressure.

Because the two sensing chambers of the transducer have substantially identical geometry and response, the differential pressure ($\Delta P$) between the outer pressure sensing surfaces of the two diaphragms (i.e. across the transducer) can be expressed as $$\Delta P = a_1(d_1 - d_2)$$

where $a_1$ is a constant and $d_1$ and $d_2$ are measures of the plate spacings of the two capacitor plate means. Taking the capacitor plate means to comprise plane parallel plates, their capacities are $$C_1 = \frac{\epsilon \epsilon_o A}{d_1}, \quad C_2 = \frac{\epsilon \epsilon_o A}{d_2},$$

where $\epsilon$ is the dielectric constant of the dielectric fluid, $\epsilon_o$ is the permittivity of free space and A is the effective area of the plates. Insofar as the capacitor plate means may vary from plane parallel plates, expressions for the capacities can still readily be devised by introducing suitable adjusting constants.

Taking the foregoing expressions for capacity, the differential pressure can be expressed:

$$\Delta P = a_1 \epsilon \epsilon_o A \left( \frac{1}{C_1} - \frac{1}{C_2} \right) \tag{1}$$

A problem with using this expression to calculate the differential pressure $\Delta P$ is that the dielectric constant $\epsilon$ varies with temperature. With prior art transducers having a single central sensing diaphragm with sensing chambers on each side, this problem can be overcome by introducing to expression (1) above the value $(d_1 + d_2)$, which for these prior art transducers is a constant.

Making the same assumptions as before, $$d_1 + d_2 = \epsilon \epsilon_o A \left( \frac{1}{C_1} + \frac{1}{C_2} \right), \tag{2}$$

so that for these prior art transducers the differential pressure can be expressed $$\Delta P = \frac{a_{10} \epsilon \epsilon_o A \left( \frac{1}{C_1} - \frac{1}{C_2} \right)}{d_1 + d_2}$$

$$= a_{10} \left( \frac{\frac{1}{C_1} - \frac{1}{C_2}}{\frac{1}{C_1} + \frac{1}{C_2}} \right),$$

where $a_{10}$ is a new constant.

However, with the transducer of the present invention, $d_1 + d_2$ is not constant, but varies as the volume of the fixed mass of said dielectric fluid varies with temperature. There may also be a relatively small variation in the dielectric fluid volume with pressure, insofar as the fluid is not completely incompressible. However, in any case, the dependency of equation (1) on variations in $\epsilon$ can be compensated for by using the Clausius-Mosotti Law according to which the permittivity $\epsilon \epsilon_o$ of the dielectric fluid is linearly related to its density.

The density $\rho = m/V$, where m is the fixed mass of the fluid in the transducer and V is the volume of the fluid.

It can be seen that for small deflections of the diaphragms of the transducer, variations in the volume are linearly related to variations in $(d_1+d_2)$. Thus, the density can be expressed in terms of $(d_1+d_2)$. It is then a relatively simple matter to combine this expression with the Clausius-Mossotti Law to express the permittivity of the fluid $\epsilon\epsilon_o$ in terms of $(d_1+d_2)$, and thence, by combining with equation (2), in terms of $C_1$ and $C_2$. This expression for $\epsilon\epsilon_o$ can then be introduced into equation (1), to produce an expression for $\Delta P$ independent of $\epsilon$.

It will be appreciated that the form of the final expression for $\Delta P$ will depend on the actual geometry of the sensing chambers and fluid passages in the transducer, but it will be noted that such an expression can be developed for each case so that the differential pressure is expressed as a function only of $C_1$ and $C_2$ and various constants. The automatic computing apparatus of the present invention may then be arranged to perform this function and calculate a value for $\Delta P$ which is substantially independent of variations in the dielectric constant with temperature.

An important advantage of this invention is that the transducer itself can be made much more simply than typical prior art transducers with a single central sensing diaphragm and two isolating diaphragms.

In one example, the transducer body is moulded of electrically insulating material and has outer surfaces defining said chamber defining surfaces which may be concave and shaped to conform with and support the associated diaphragm at its maximum inwards deflection.

Conveniently, the transducer comprises a hollow circular cylinder of metal with the body moulded into the cylinder so that said concave surfaces are at opposite ends of the cylinder.

Then, the diaphragms may be secured about their peripheries to respective ends of the metal cylinder. Normally, the diaphragms are of metal and they may be connected together via the metal cylinder.

In a preferred example, the body is moulded of a polyphosphate material and, conveniently, said means on said first and second housing surfaces comprise respective conducting films.

The electrical signal generating means may be arranged to provide a third signal representative of the difference between the electrical capacities of the two capacitor plate means, and the automatic computing apparatus is arranged to receive the third signal also and use the value represented by the third signal in computing the value of said differential pressure.

Figure 2:
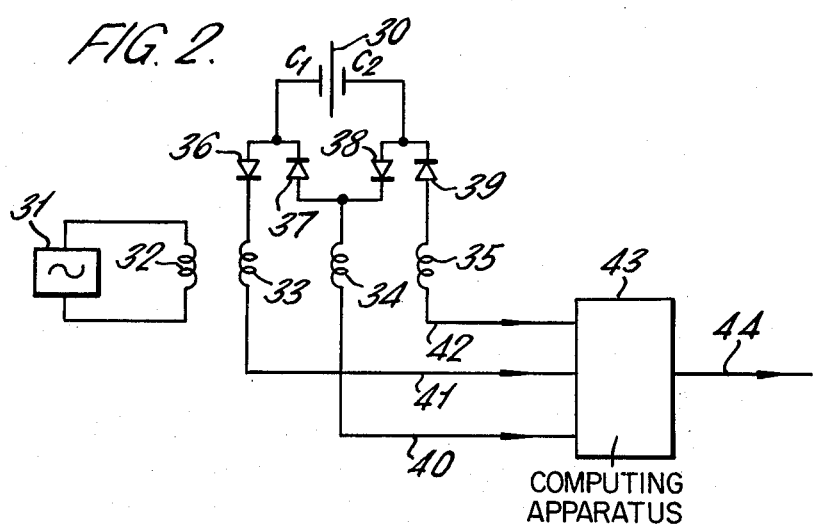

An example of the present invention is now described with reference to the accompanying drawings in which:

FIG. 1 is a schematic view in cross section of a transducer for use in an embodiment of the differential pressure sensing apparatus of the present invention and, FIG. 2 is a schematic diagram of electrical signal generating and automatic computing apparatus for producing a signal representative of the differential pressure sensed by the transducer of the FIG. 1.

The example of differential pressure transducer shown in FIG. 1 has a generally circular cylindrical outline and the figure is an axial cross section. Thus, the transducer comprises a stainless steel shell 10 in the form of a short open circular cylinder or a ring. In the illustrated example the outer cylindrical surface is substantially smooth, but the interior surface 11 includes an inwardly extending annular ridge 12.

A body 13 of a mouldable material is moulded into the interior of the cylindrical shell 10 so as to substantially fill the interior of the shell. The body 13 is of a mouldable electrical insulating material and convenient material is a polyphosphate. It will be appreciated that the body 13 has a generally solid cylindrical shape conforming with the interior surface of the shell 10. However, the ends of the body 13 are spherically dished as shown in FIG. 1 so as to form concave end surfaces 14 and 15. The peripheral edges of the surfaces 14 and 15 adjacent to the corresponding ends of the shell 10 are flush with these ends.

A respective metal diaphragm 16, 17 is located closing off each end of the shell 10 so as to form between the respective diaphragm and the adjacent concave end surface 14, 15 a sensing chamber 18, 19. Each diaphragm 16, 17 is formed as a thin circular sheet of metal and is electrically connected about its periphery to the corresponding end of the shell 10. As will become apparent, each diaphragm, 16, 17 can deflect inwardly or outwardly in response to variations in the pressure of a medium on the outer pressure sensing surface of the diaphragm. Inward deflection of the diaphragm is limited by the diaphragm contacting the corresponding end surface 14, 15 of the body 13 of the transducer. The end surfaces 14, 15 are, accordingly, shaped so as to conform with the diaphragms 16 and 17 at this maximum inwards deflection so as to support the diaphragms over substantially their entire deflecting areas.

An electrically conducting layer 20, 21 is deposited over at least a central region of each of the end surfaces 14 and 15. The conducting layers 20, 21 typically metal, are generally circular having a diameter slightly less than the interior diameter of the shell 10 so that the peripheral edges of the layers 20 and 21 are spaced from their corresponding diaphragms 16 and 17.

Each chamber 18, 19 with its associated metal diaphragm 16, 17 and conducting layer 20, 21 forms a respective sensing chamber with the diaphragm and conducting layer together forming a respective capacitor having one plate constituted by the diaphragm and the other plate constituted by the conducting layer on the end surface of the body 13. It will be appreciated that the two diaphragms 16 and 17 are connected together by the shell 10 of the transducer. On the other hand, a respective lead out wire 22, 23 is provided connected to each of the conducting layers 20, 21. The lead out wires 22 and 23 may be moulded in to the body 13 of the transducer and passed through the wall of the shell 10 through insulated bores 24 and 25.

The two chambers 18 and 19 of the transducer are inter-connected by a fluid passage 26 and a further filling passage 27 is provided connecting with the passage 26 and leading through the shell 10. The chambers 18 and 19 and the passages 26 and 27 are completely filled with a substantially non-compressible dielectric fluid, such as oil. Once the chambers 18 and 19 and the passages 26 and 27 are filled, the oil filler passage 27 is sealed off so that the transducer then contains a fixed mass of the oil.

In operation, the transducer is located so that the outer sensing surfaces of the diaphragms 16 and 17 are exposed respectively to the mediums between which the differential pressure is to be measured. Typically, one of the diaphragms is exposed to a medium at a reference pressure and the other is exposed to a medium of which the pressure is to be measured.

Referring now to FIG. 2, there is shown a block schematic diagram illustrating signal generating apparatus and automatic computing apparatus which is connected to the transducer of FIG. 1 to provide a signal representing the differential pressure sensed by the transducer. The two capacitors of the transducer are represented at 30. The plates constituted by the two diaphragms 16 and 17 are, of course, connected together and are connected to earth when the transducer is in operation.

A signal generator 31 generates an alternating signal having a constant voltage-frequency product. The output of the generator 31 is supplied to a primary winding 32 of a transformer which has three secondary windings 33, 34 and 35. The three secondary windings are coupled to the two capacitors of the transducer 30 via the lead out wires 22 and 23 of the transducer and via a network of four diodes 36, 37, 38 and 39. The diodes are arranged as shown in FIG. 2 so that the mean current flowing in the secondary 33 is proportional to the value $C_1$ of one of the two capacitors of the transducer; the mean current in the secondary 35 is proportional to minus the value $C_2$ of the other capacitor of the transducer; and the mean current in the secondary 34 is proportional to the difference between the values $C_2$ and $C_1$. Thus, the circuit including the generator 31, the transformer and the network of diodes provide current signals representative not only of the values of the capacitors of the transducer but also of the difference in these values. These three current signals are fed on lines 40, 41 and 42 to an automatic computing apparatus 43. In the automatic computing apparatus 43 the signals are digitised and converted into the capacity values that they represent. The apparatus 43 then performs the required mathematicl operations on these three values to produce an output signal on a line 44 representative of the differential pressure sensed by the transducer.

The form of the mathematical operation performed by the computing apparatus 43 depends on the precise geometry of the transducer with which the circuitry of FIG. 2 is being used. However, considering the geometry of the example of FIG. 1, and using the same notation as previously herein, the differential pressure $\Delta P$ can be represented in terms of $C_1$ and $C_2$ by the equation (1) referred to previously. Further, $d_1 + d_2$ is related also to $C_1$ and $C_2$ by the equation (2) referred to previously.

For the example of FIG. 1, the density $\rho$ can be expressed as:

$$\rho = \frac{m}{\frac{A}{2}(d_1 + d_2)} \quad (3)$$

This assumes that the volume of oil contained in the passages 26 and 27 of the transducer is insignificant compared with the volume in the chambers 18 and 19; and also that the values $d_1$ and $d_2$ are very small compared with the radius of curvature of the end surfaces 14 and 15 of the body 13 of the transducer.

Also, by the Clausius-Mosotti Law, $$\epsilon\epsilon_o = \frac{a_2}{A(d_1 + d_2)} \quad (4)$$

where $a_2$ is a constant. In practice there may be a constant term as well on the right hand side of equation (4).

Thus, combining equations (2) and (4) produces:

$$\epsilon\epsilon_o A = \frac{a_2^{\frac{1}{2}}}{\left(\frac{1}{C_1} + \frac{1}{C_2}\right)^{\frac{1}{2}}} \quad (5)$$

Substituting this in equation (1) produces:

$$\Delta P = \frac{a_3\left(\frac{1}{C_1} - \frac{1}{C_2}\right)}{\left(\frac{1}{C_1} + \frac{1}{C_2}\right)^{\frac{1}{2}}} \quad (6)$$

where $a_3$ is constant.

Thus, there is produced an expression for the differential pressure which is independent of the permativitiy of the oil filling the transducer. Equation (6) may be re-written as $$\Delta P = \frac{a_3(C_2 - C_1)}{[C_1 C_2 (C_1 + C_2)]^{\frac{1}{2}}} \quad (7)$$

With the transducer of FIG. 1, the automatic computing apparatus 43 is arranged to perform the operation of equation (7) above to produce a value for the differential pressure sensed by the transducer. This value should then be substantially independent of temperature except insofar as increased volume of oil at higher temperatures may deflect both the diaphragm 16 and 17 outwards to such an extend as to alter their spring rates. It is important to make the spring rates at normal operating temperatures of the two diaphragms 16 and 17 substantially equal. Also, the spring rates should not vary appreciably with temperature and, further, the expansion co-efficients of the material of the diaphragms should be matched with that of the material of the cylindrical metal shell 10 so that there is negligible differential expansion to alter the stresses in the diaphragms.

As explained previously, for other geometries of transducer the expression relating differential pressure to the capacity value can be developed and the automatic computing apparatus arranged to perform appropriate functions to produce the desired differential pressure value.

I claim:

1. A differential pressure sensing apparatus including a transducer having a body and comprising a pair of sensing chambers of substantially identical geometry and pressure response, each said chamber being defined by a diaphragm and an associated surface of the body, the diaphragm having a respective outer pressure sensing surface, and each chamber having capacitor plate means including the associated diaphragm and means on the associated body surface, whereby a corresponding deflection of each of the two diaphragms causes a corresponding change in the electrical capacity of the respective capacitor plate means, the transducer further comprising fluid passage means between the two sensing chambers, and a fixed mass of a substantially non-compressible dielectric fluid filling said two chambers and the fluid passage means whereby a change in the differential pressure between the outer pressure sensing surfaces of the two diaphragms causes one diaphragm to deflect inwards relative to its associated sensing chamber and the other to deflect by a corresponding amount outwards relative to its associated sensing chamber, the apparatus further including electrical signal generating means responsive to said capacitor plate means to provide at least respective signals representative of the electrical capacities of the two capacitor plate means, and means for receiving at least respective signals and for providing from such signals a compensation term which is representative of variations of the volume and hence the density of the fixed mass of said fluid and for further providing from such signals and said compensation term a value for the differential pressure which is substantially independent of variations with temperature in the dielectric constant of the dielectric fluid.

2. Apparatus as claimed in claim 1 wherein said means for receiving at least said respective signals provides an output signal substantially corresponding with the expression:

$$\text{differential pressure} = \frac{a_3 (C_2 - C_1)}{[C_1 C_2 (C_1 + C_2)]^{\frac{1}{2}}}$$

where $C_1$ and $C_2$ are the capacity values represented by the respective signals and $a_3$ is a constant.

3. Apparatus as claimed in claim 1 wherein the transducer body is moulded of electrically insulating material and has outer surfaces defining said chamber defining surfaces.

4. Apparatus as claimed in claim 3, wherein said outer surfaces of the body are each concave and shaped to conform with and support the associated diaphragm at its maximum inwards deflection.

5. Apparatus as claimed in claim 4, wherein the transducer comprises a hollow circular cylinder of metal with the body moulded into the cylinder so that said concave surfaces are at opposite ends of the cylinder.

6. Apparatus as claimed in claim 5, wherein the diaphragms are secured about their peripheries to respective ends of the metal cylinder.

7. Apparatus as claimed in claim 6, wherein the diaphragms are of metal and are connected together via the metal cylinder.

8. Apparatus as claimed in claim 3 wherein the body is moulded of a polyphosphate material.

9. Apparatus as claimed in claim 3 wherein said means on the associated body surfaces, forming said capacitor plate means with the associated diaphragms, comprise respective conducting films.

10. Apparatus as claimed in claim 1 wherein the electrical signal generating means is arranged to provide a third signal representative of the difference between the electrical capacities of the two capacitor plate means, and the means for receiving is arranged to receive the third signal also and use the value represented by the third signal in computing the value of said differential pressure.

* * * * *

UNITED STATES PATENT AND TRADEMARK OFFICE
CERTIFICATE OF CORRECTION

PATENT NO. : 4,398,194

DATED : August 9, 1983

INVENTOR(S) : James S. Johnston

It is certified that error appears in the above-identified patent and that said Letters Patent is hereby corrected as shown below:

Claim 1, line 28, (Column 7, line 9), after "least" insert --said--.

Signed and Sealed this

Twentieth Day of March 1984

[SEAL]

Attest:

GERALD J. MOSSINGHOFF

Attesting Officer

Commissioner of Patents and Trademarks